(12) United States Patent
Abe et al.

(10) Patent No.: US 6,876,380 B2
(45) Date of Patent: Apr. 5, 2005

(54) ELECTRONIC ENDOSCOPIC APPARATUS CONNECTABLE WITH ELECTRONIC ENDOSCOPE HAVING DIFFERENT NUMBER OF PIXELS

(75) Inventors: Kazunori Abe, Saitama (JP); Fujio Okada, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 563 days.

(21) Appl. No.: 10/098,481

(22) Filed: Mar. 18, 2002

(65) Prior Publication Data

US 2002/0140806 A1 Oct. 3, 2002

(30) Foreign Application Priority Data

Mar. 30, 2001  (JP) ........................................ 2001-102274

(51) Int. Cl.[7] ................................................. H04N 7/18
(52) U.S. Cl. ......................................................... 348/72
(58) Field of Search ............................. 348/65, 72, 75; 600/172

(56) References Cited

U.S. PATENT DOCUMENTS

| | | | | |
|---|---|---|---|---|
| 4,816,909 A | * | 3/1989 | Kimura et al. ................. | 348/71 |
| 4,891,695 A | * | 1/1990 | Uchikubo et al. ............. | 348/72 |
| 4,926,258 A | * | 5/1990 | Sasaki et al. .................. | 348/72 |
| 5,614,943 A | * | 3/1997 | Nakamura et al. ............ | 348/72 |
| 5,627,583 A | * | 5/1997 | Nakamura et al. ............ | 348/72 |
| 6,215,517 B1 | * | 4/2001 | Takahashi et al. ............ | 348/72 |

* cited by examiner

*Primary Examiner*—Vu Le
(74) *Attorney, Agent, or Firm*—Ronald R. Snider; Snider & Associates (57) ABSTRACT

An electronic endoscopic apparatus having various sorts of electronic endoscopes mounting a CCD with a different number of pixels, for example, 410,000 pixels, 270,000 pixels or 190,000 pixels that are connectable to a processor. A CCD drive and signal processing circuit drives all the CCDs at a frequency set up for the CCD with 410,000 pixels, and an information quantity conversion circuit expands an image acquired by the CCD with 270,000 pixels or 190,000 pixels by pixel interpolation in a horizontal direction or a vertical direction to form an image with an aspect ratio of 4 to 3. Also, a video signal acquired in an NTSC system is converted into a video signal of a PAL system by using a television standard conversion circuit, thereby displaying an excellent PAL video without any bar noise.

4 Claims, 6 Drawing Sheets

ELECTRONIC ENDOSCOPIC APPARATUS CONNECTABLE WITH ELECTRONIC ENDOSCOPE HAVING DIFFERENT NUMBER OF PIXELS

BACKGROUND OF THE INVENTION

This application claims the priority of Japanese Patent Applications No. 2001-102274 filed on Mar. 30, 2001 which is incorporated herein by reference.

1. Field of the Invention

The present invention relates to an electronic endoscopic apparatus that is used by connecting various sorts of electronic endoscopes mounting an image pickup element with a different number of pixels to a processor.

2. Description of the Related Art

In an electronic endoscopic apparatus, an electronic endoscope having a CCD (Charge Coupled Device) as an image pickup element at its top end is connected to a processor. A video signal acquired by the CCD undergoes a predetermined video processing in the electronic endoscope and the processor, whereby a video of the observed subject is displayed on a monitor.

In recent years, the electronic endoscopes mounting a CCD with a greater number of pixels have been manufactured in a relatively short cycle one after another to produce a high resolution video, whereby the electronic endoscopes having the CCD with a different number of pixels are connected to the same processor. For example, a CCD 1 having 410,000 pixels, a CCD 2 having 270,000 pixels, and a CCD 3 having 190,000 pixels are provided, as shown in FIGS. 9A to 9C.

Figure 9A:
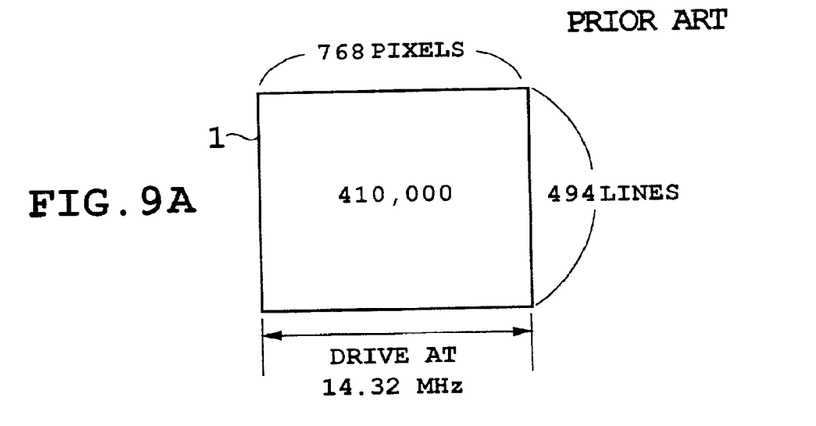
FIGS. 9A to 9C are diagrams showing a configuration of various kinds of CCD having a different number of pixels which conventionally exist.

The CCD 1 having 410,000 pixels as shown in FIG. 9A has an image pickup area consisting of 768 pixels in a horizontal direction and 494 lines in a vertical direction. The CCD 2 having 270,000 pixels as shown in FIG. 9B has an image pickup area consisting of 510 pixels in the horizontal direction and 492 lines in the vertical direction. And the CCD 3 having 190,000 pixels as shown in FIG. 9C has an image pickup area consisting of 362 pixels in the horizontal direction and 492 lines in the vertical direction.

However, in the conventional electronic endoscopic apparatus, the electronic endoscopes mounting the CCD having a different number of pixels are connected to the same processor, thereby generating a different frequency (frequency for the CCD drive and signal processing) corresponding to the number of pixels, resulting in a problem that the circuit or the signal processing is complicated.

Figure 9B:
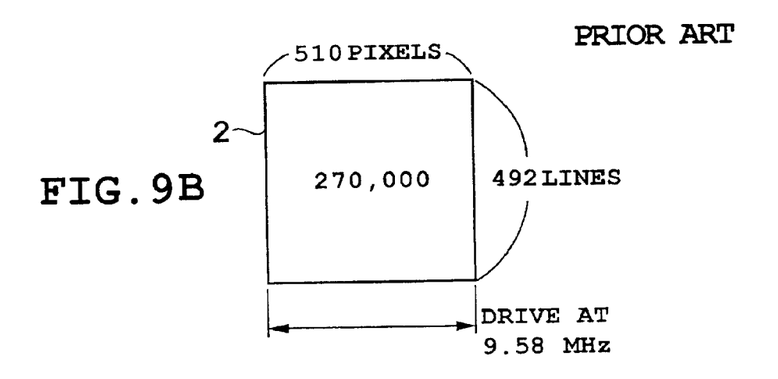
Figure 9C:
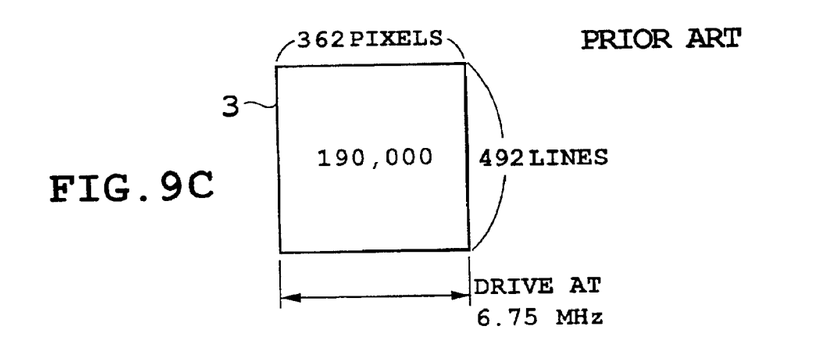

That is, the drive frequency for reading the pixel information is 14.32 MHz for 410,000 pixels as shown in FIG. 9A, 9.58 MHz for 270,000 pixels as shown in FIG. 9B, or 6.75 MHz for 190,000 pixels as shown in FIG. 9C. Therefore, it is required that these drive frequencies and other signal processing frequencies are produced corresponding to the number of pixels for the CCD within the electronic endoscope, so that the circuit for generating each of the above frequencies is complicate and the video processing based on the different frequencies is intricate.

SUMMARY OF THE INVENTION

The present invention has been achieved in the light of the above-mentioned problems, and it is an object of the invention to provide an electronic endoscopic apparatus that can easily perform the video processing with an image pickup element having a different number of pixels without any use of the frequencies for the CCD drive and signal processing corresponding to the number of pixels.

In order to attain the above object, the present invention provides an electronic endoscopic apparatus having various sorts of electronic endoscopes mounting an image pickup element having a different number of pixels, the electronic endoscopes being connected to a processor, comprising a signal processing circuit for driving the image pickup element having the different number of pixels at a frequency set up for a reference pixel number, and making the video processing based on the frequency, and an information quantity conversion circuit for supplementing the insufficient pixel information, and forming a video with a predetermined aspect ratio, when an electronic endoscope having the image pickup element with other number of pixels than the reference pixel number is connected.

Also, another invention provides the electronic endoscopic apparatus, wherein the signal processing circuit drives the image pickup element based on an NTSC (National Television System Committee) system, and the electronic endoscopic apparatus further comprises the main memories (a first memory and a second memory) for memorizing the video signal data acquired at a timing of the NTSC system in sequence, an auxiliary memory (a third memory) for memorizing the same video signal data stored in the main memory, and a conversion circuit for converting a video signal of the NTSC system into the video signal of the other television standard such as the PAL (Phase Alternation by Line) system, in which the video signal data is read from the main memory at a timing of the other television standard, and for the data in a period for which the writing of the next data overtakes the reading of the data in the main memory, the writing of the data into the auxiliary memory is inhibited and the data is read from the auxiliary memory.

With the above configuration, a drive frequency of 14.32 MHz for 410,000 pixels (reference pixel number) is employed, and even when an electronic endoscope having a CCD with 270,000 pixels or 190,000 pixels is connected, the pixels of the CCD are read at the drive frequency, whereby the video processing is made in accordance with a horizontal synchronization signal or a vertical synchronization signal based on this drive frequency. And in the information quantity conversion circuit, the number of pixels is expanded (pixel interpolation) in the horizontal direction in a case of 270,000 pixels, and expanded in the horizontal direction and the vertical direction in a case of 190,000 pixels or other pixels. In this manner, a video with an aspect ratio of 4 to 3 is displayed on the display screen.

With still another invention, for the signal of the NTSC system that has undergone the information quantity conversion, the odd field data is written in the first memory and the third memory, and the even field data is written in the second memory and the third memory alternately at a rate of 1/60 sec. in one vertical scanning period. Thereafter, the odd field data is read from the first memory and the even field data is read from the second memory alternately at a rate of 1/50 sec. in one vertical scanning period of the PAL system. On the other hand, a period (a position from a predetermined start point) in which the writing of the next data overtakes the reading of the data from the first or second memory is obtained in advance, and at the time of overtaking, the writing into the third memory is inhibited before overtaking, and the data is read from the third memory. Thereby, the field data in a condition where the writing overtakes the reading is not employed, so that the bar noise is prevented from arising.

DETAILED DESCRIPTION OF THE PREFERRED EMBODIMENTS

First Embodiment

Figure 1:
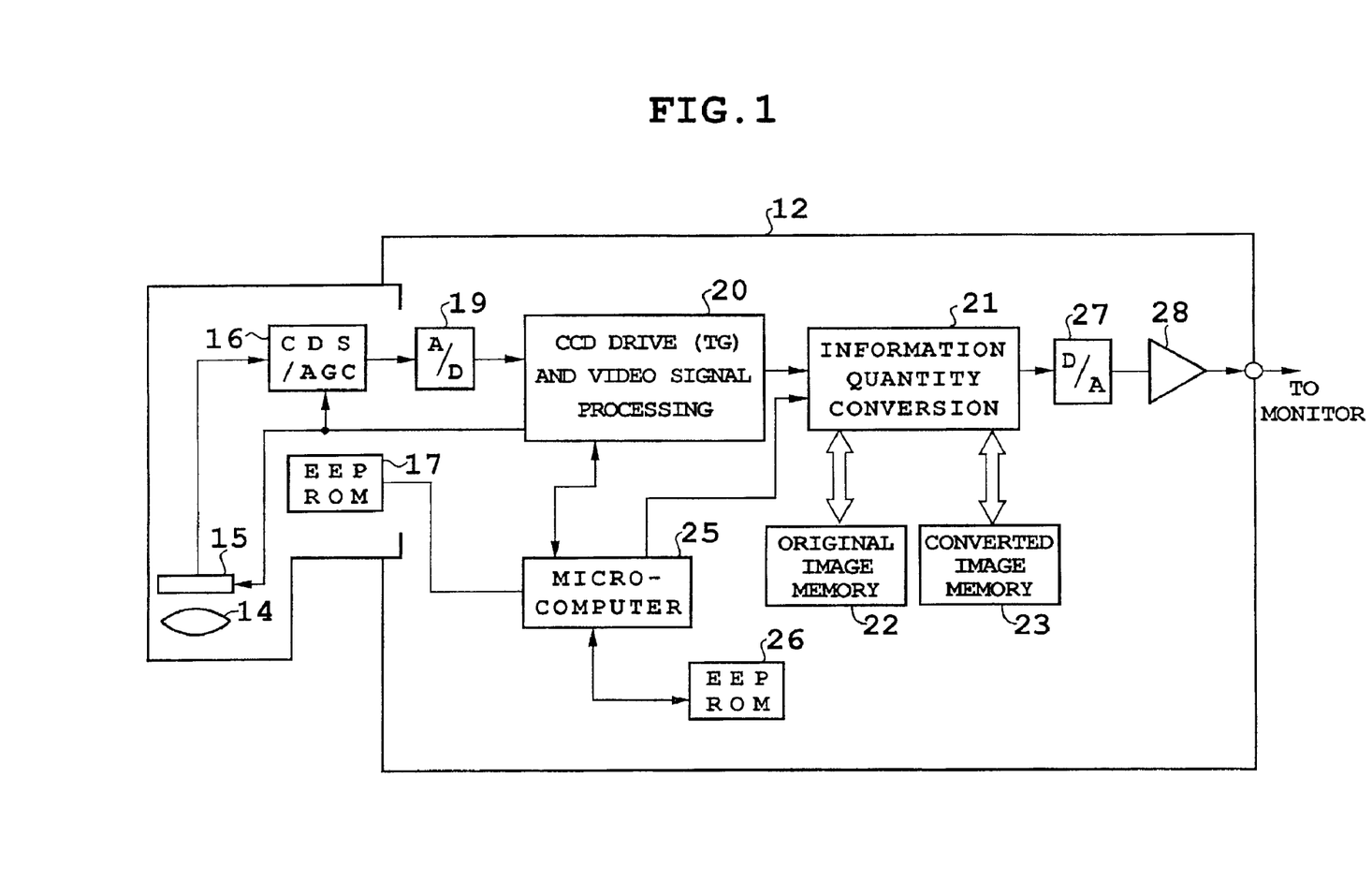
FIG. 1 is a block diagram showing a circuit configuration of an electronic endoscopic apparatus according to a first embodiment of the present invention.

FIG. 1 shows a configuration of an electronic endoscopic apparatus according to a first embodiment of the invention, in which an electronic endoscope 10 is connected to a processor 12. This electronic endoscope 10 is provided with a CCD 15 via an objective optics system 14 at its top end portion, in which the CCD 15 has 410,000 pixels, 270,000 pixels or 190,000 pixels, and has a CDS/AGC circuit 16 for making a correlating double sampling (CDS) and an automatic gain control (AGC) for an output signal of this CCD 15. A ROM (EEPROM) 17 storing the data for identifying the number of pixels for the CCD 15 is provided, in which the data of the ROM 17 is sent to the processor 12 at the time of power on.

On the other hand, the processor 12 is provided with an A/D converter 19 for accepting an output signal from the CDS/AGC circuit 16 and a CCD drive and video signal processing circuit 20 for issuing a drive signal to the CCD 15 and making various processings such as a color conversion process, a gamma correction and a contour highlighting for an output signal from the CCD 15. This CCD drive and video signal processing circuit 20 is provided with a timing generator (TG) having an oscillator, which oscillates a pixel drive frequency of 14.32 MHz useful for the CCD 15 having 410,000 pixels, whereby a horizontal synchronization signal of 15.734 kHz, a vertical synchronization signal of 59.94 Hz, and other timing signals for sampling frequency are produced from this oscillation frequency.

At a later stage of this CCD drive and video signal processing circuit 20, there are provided an information quantity conversion circuit 21 for supplementing (interpolating) the pixel information quantity when the CCD 15 having other number of pixels than 410,000 pixels is connected, with the reference number of pixels being 410,000 pixels, an original image memory 22 for memorizing directly an output video signal of the CCD drive and video signal processing circuit 20, and a converted image memory 23 for memorizing the video signal after the information quantity conversion.

Also, a microcomputer 25 for controlling the information quantity conversion and generally controlling various circuits, and a ROM (EEPROM) 26 are provided. At a later stage of the information quantity conversion circuit 21, a D/A converter 27 and a buffer 28 are connected. A video signal output from this buffer 28 is supplied to a monitor.

The first embodiment has the above configuration. The operation of this first embodiment will be described below. First of all, in the electronic endoscopic apparatus of FIG. 1, if the power of the processor 12 is turned on, the microcomputer 25 determines the number of pixels for the CCD 15 by communicating with the electronic endoscope 10 (ROM 17). On the other hand, the CCD 15 of the electronic endoscope 10 is supplied with a pixel drive frequency of 14.32 MHz produced in the CCD drive and video signal processing circuit 20, and a horizontal synchronization signal and a vertical synchronization signal produced on the basis of this pixel drive frequency. In this CCD 15, electric charges accumulated in units of pixel are read as the pixel data at the above frequency. Also, the CDS/AGC circuit 16 is supplied with a sampling frequency, in which a video signal sampled and amplified is passed through the A/D converter 19 to a video signal processing portion within the CCD drive and video signal processing circuit 20 to make various processings for forming the video such as color conversion and gamma correction.

An output from the CCD drive and video signal processing circuit 20 is supplied to the information quantity conversion circuit 21. When the microcomputer 25 determines that the CCD 15 of the electronic endoscope 10 has 410,000 pixels, the information quantity conversion is not made by this information quantity conversion circuit 21. That is, a video signal, once memorized in an original image memory 22, is output via the D/A converter 27 and the buffer 28 to the monitor, whereby a video of the observed subject picked up by the CCD 15 having 410,000 pixels is displayed on the monitor.

On the other hand, when the microcomputer 25 determines that the CCD 15 of the connected electronic endoscope 10 has 270,000 pixels or 190,000 pixels, the information quantity is expanded in the information quantity conversion circuit 21. That is, an output from the CCD drive and video signal processing circuit 20 is once stored in the original image memory 22 for every field, and thereafter an image of one field read from the original image memory 22 is expanded (pixel interpolation) in the horizontal and vertical directions.

Figure 2A:
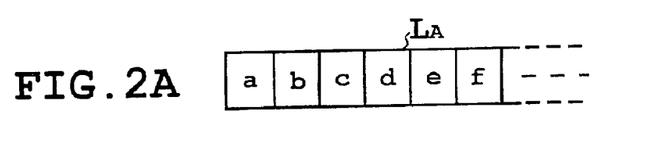
FIGS. 2A and 2B are explanatory diagrams showing an example of a pixel interpolation in a horizontal direction in the first embodiment of the invention.
Figure 2B:
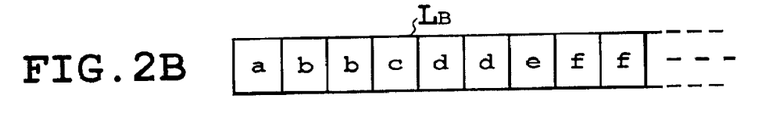

FIGS. 2A and 2B show a pixel interpolation in the horizontal direction. In the case where the pixel data is a, b, c, d, e, f, . . . , as indicated by the horizontal line LA in FIG. 2A, the same pixel data is supplemented at predetermined ratio to provide the image data a, b, b, c, d, d, e, f, f, . . . , as indicated by the horizontal line $L_B$ in FIG. 2B, whereby the image data is expanded by about 30%.

Figure 3A:
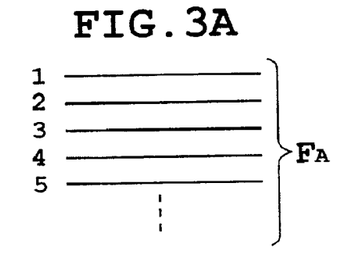
FIGS. 3A and 3B are explanatory diagrams showing an example of the pixel interpolation (line interpolation) in a vertical direction in the first embodiment of the invention.
Figure 3B:
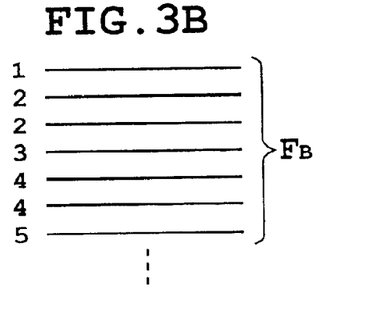

FIGS. 3A and 3B show a pixel interpolation (line interpolation) in the vertical direction. In the case where the horizontal line data is 1, 2, 3, 4, 5, . . . in the field $F_A$ of FIG. 3A, the same line data is supplemented at predetermined ratio to provide the horizontal line data 1, 2, 2, 3, 4, 4, 5, . . . in the field $F_B$ of FIG. 3B, whereby the line data is expanded by about 30%. Also, the conventional pixel interpolation methods may be employed to add the insufficient pixel data without using the method of FIGS. 2A and 2B and FIGS. 3A and 3B.

Figure 4:
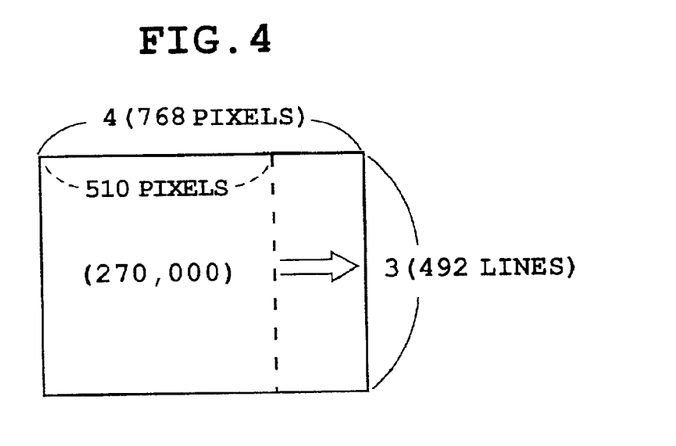
FIG. 4 is a diagram showing a conversion of information quantity that is performed for a video produced by a CCD having 270,000 pixels in the first embodiment of the invention.

When the CCD 15 of the electronic endoscope 10 connected to the processor 12 has 270,000 pixels, the information quantity conversion circuit 21 expands the pixel information quantity only in the horizontal direction. This state is shown in FIG. 4, in which 510 pixels in the horizontal direction are expanded to 768 pixels by the method of FIG. 2. In contrast, there are 492 lines in the vertical direction, with only a difference of two lines. In this state, an image with an aspect ratio of 3 (length) to 4 (width) can be displayed on the monitor.

Figure 5:
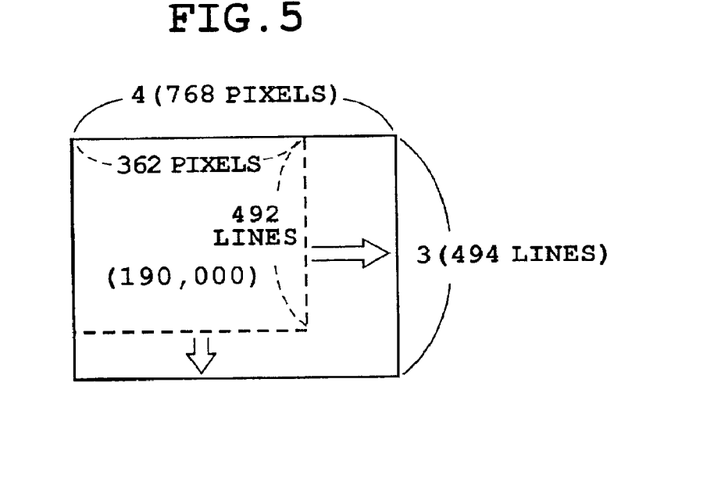
FIG. 5 is a diagram showing the conversion of information quantity that is performed for a video produced by a CCD having 190,000 pixels in the first embodiment of the invention.

Also, when the CCD 15 of the electronic endoscope 10 connected to the processor 12 has 190,000 pixels or other pixels, the information quantity conversion circuit 21 expands the pixel information quantity in the horizontal and vertical directions. This state is shown in FIG. 5, in which 362 pixels in the horizontal direction are expanded to 768 pixels by the method of FIG. 2, and 492 lines are expanded to 494 lines by the method of FIG. 3. In this manner, an image with an aspect ratio of 3 to 4 can be displayed on the monitor.

As described above, with the first embodiment of the invention, the video processing can be easily performed, using the image pickup element having a different number of pixels, rather than the CCD drive and signal processing frequency corresponding to the number of pixels, thereby resulting in the less complicate circuit and less complex process.

Second Embodiment

Figure 6:
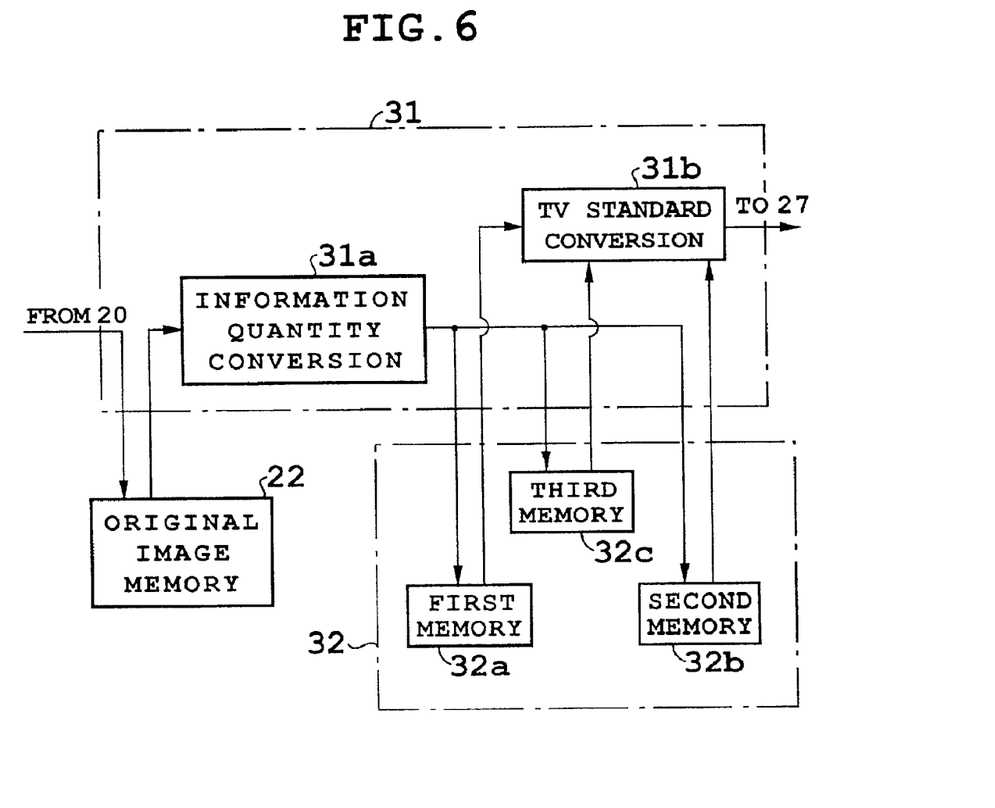
FIG. 6 is a block diagram showing a circuit configuration of an electronic endoscopic apparatus according to a second embodiment of the invention.

FIG. 6 shows a configuration of an electronic endoscopic apparatus according to a second embodiment of the invention, in which a video signal of the NTSC system is converted into the video signal of the PAL system. Namely, since the vertical scanning period is different in the signal conversion between the NTSC system and the PAL system in the electronic endoscopic apparatus, a phenomenon occurs in which the writing of the next NTSC data overtakes the reading of the PAL data from the image memory, causing the bar noise horizontally on the monitor. The second embodiment resolves this bar noise.

FIG. 6 shows a configuration of replacing the information quantity conversion circuit 21, the original image memory 22 and the converted image memory 23 as shown in FIG. 1. A conversion circuit 31 comprises an information quantity conversion circuit 31a and a television (TV) standard conversion circuit 31b, which are configured in the same manner as in the first embodiment, and a converted image memory 32 comprises a first memory 32a that is a main memory, a second memory 32b and a third memory 32c that is an auxiliary memory. That is, the odd field data and the even field data of the NTSC system are stored in the first memory 32a and the second memory 32b, respectively, and both data are stored in the third memory 32c in sequence. The TV standard conversion circuit 31b converts the horizontal line data of 525 lines of the NTSC system read from these memories 32a to 32c into the horizontal line data of 625 lines of the PAL system. This conversion is made by the vertical or horizontal pixel-to-pixel interpolation.

The microcomputer 25 controls not only the information quantity conversion but also the TV standard conversion, and the ROM (EEPROM) 26 stores beforehand the information as to a write inhibit period of the third memory 32c, corresponding to the period for which the writing of the next data overtakes the reading of the data in the first memory 32a and the second memory 32b. This information corresponds to a field number (a number set within a predetermined time) that is counted from a start point $T_D$ of FIG. 8, for example. The TV standard conversion circuit 31b can output directly a video signal of the NTSC system under the switching control.

The second embodiment has the above configuration. When the PAL monitor is connected to the processor 12, the microcomputer 25 outputs a command of TV standard conversion process to the TV standard conversion circuit 31b.

Figure 7A:
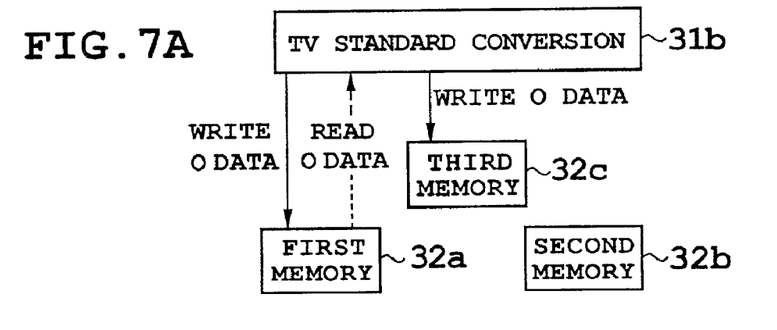
FIGS. 7A to 7C are explanatory diagrams for explaining a write operation and a read operation at the time of television standard conversion for converted image memories (first to third memories) in the second embodiment of the invention.
Figure 7B:
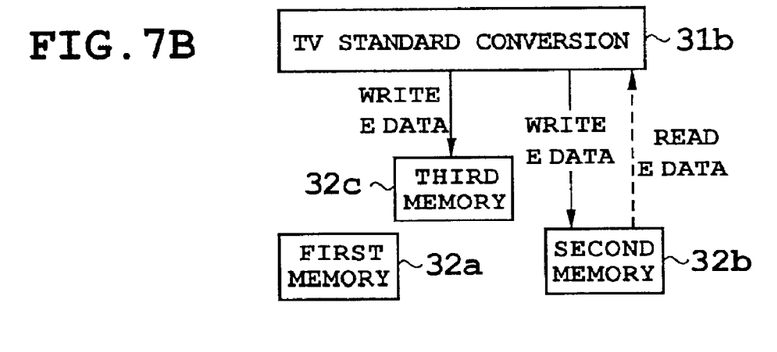
Figure 7C:
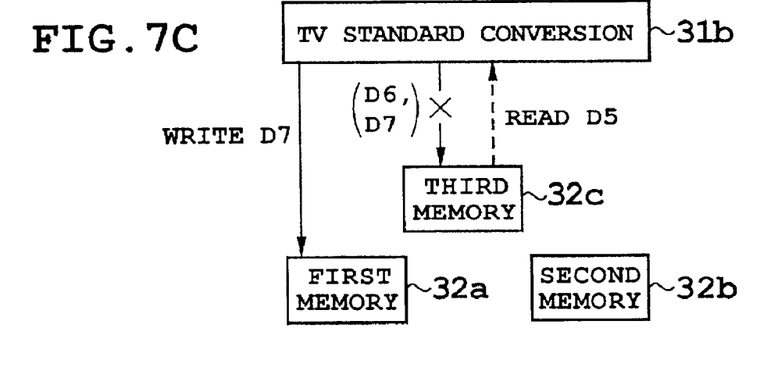

FIGS. 7A to 7C show the writing and reading processes for each of the memories 32a to 32c within the converted image memory 32 in making the TV standard conversion. As shown in FIG. 7A, the odd field data (O data) is written at a timing of the NTSC system (vertical scanning period of $\frac{1}{60}$ sec.) into the first memory 32a and the third memory 32c simultaneously, and thereafter, this O data is usually read from the first memory 32a at a timing of the PAL system (vertical scanning period of $\frac{1}{50}$ sec.). Also, the even field data (E data) is written at a timing of the NTSC system into the second memory 32b and the third memory 32c simultaneously, and thereafter, this E data is usually read from the second memory 32b at a timing of the PAL system, as shown in FIG. 7B.

And for the period for which the write of the new data D7 overtakes the reading of the odd field data (D5) in the first memory 32a, the writing of the data D6 and D7 into the third memory 32c is inhibited, and the data D5 is read, as shown in FIG. 7C. This will be described below in detail with reference to FIG. 8.

Figure 8:
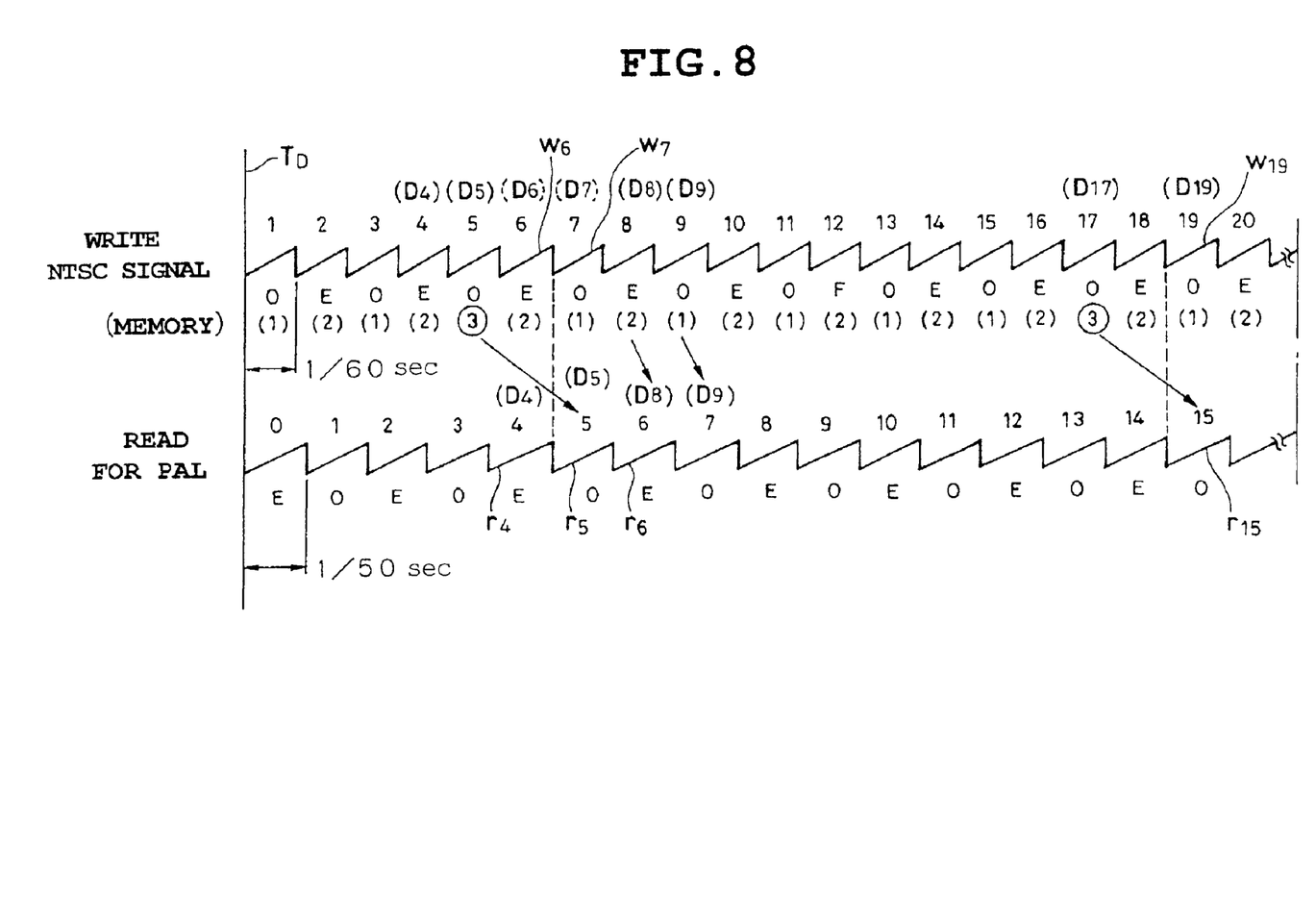
FIG. 8 is a chart showing a write timing of an NTSC signal and a read timing for a PAL system conversion in the second embodiment of the invention.

FIG. 8 shows a write timing of NTSC signal and a read timing of PAL conversion. In the NTSC to PAL conversion, the writing of data D7 overtakes the reading of data D5 at a position of the fifth read period $r_5$ for the PAL conversion or the seventh write period $w_7$ of the NTSC signal, and the writing of data D19 overtakes the reading of data D15 at a position of the read period $r_{15}$ or the write period $w_{19}$. At this time, the data in the first memory 32a is not read, but the field data D5 and D17 stored in the third memory 32c are read.

Exemplifying the field data D5, the odd field data D5 is written in the third memory 32c, the writing of data D6 and D7 is inhibited for the periods $w_6$ and $w_7$, and the data D5 is read from the third memory 32c. Accordingly, in this case, the data are read in the order of D4, D5, D8 and D9, and the data D6 and D7 are cut. That is, the next data is read in the form of skipping one frame at the time of overtaking. Also, the odd field data D17 is read in the same way from the third memory 32c. Further, the write inhibit of the third memory 32c and the data reading operation from the third memory for that period are repeated by making a reset to the start point $T_D$ of FIG. 8 for every predetermined period of time.

The field data read in the above manner is converted into the field signal (625/2 horizontal lines) for the PAL system through the interpolation process by the TV standard conversion circuit 31b, and finally supplied as a frame signal of 625 horizontal lines to the PAL monitor. As a result, a video of the observed subject without horizontal bar noise is displayed on the PAL monitor.

In this second embodiment, the use of the third memory 32c provides the following advantages. That is, the data D6 in the sixth period $w_6$ of the NTSC signal can be read as the data in the period $r_5$ for the PAL system, but because all the periods $r_4$ to $r_6$ for the PAL system become the even field data (D4 to D6 to D8), there is a disadvantage that the vertical resolution is decreased, as can be seen from FIG. 8. However, in this second embodiment, since the odd and even field data are alternately arranged, the required data, or the odd field data, can be acquired, whereby the vertical resolution is not degraded.

In this second embodiment, the TV standard conversion is made after the information quantity conversion, but the information quantity conversion may be made after the TV standard conversion. The conversion from the NTSC system to the PAL system has been described, but the present invention may also be applied to the conversion from the NTSC system to the other TV standard.

As described above, with this second embodiment of the invention, the auxiliary memory is employed to read the data during the period for which the writing of the next data overtakes the reading of the data in the main memory, and, for example, the television standard conversion circuit for making conversion into the video signal of the PAL system is provided with the information quantity conversion circuit, whereby the excellent video can be displayed on the monitor of the PAL system or the like by suppressing the bar noise that occurs in making the television standard conversion.

What is claimed is:

1. An electronic endoscopic apparatus, comprising:

various sorts of electronic endoscopes mounting an image pickup element having a different number of pixels;

a processor to which said electronic endoscopes are connected;

a signal processing circuit, disposed in said processor, for driving said image pickup element having the different number of pixels at a frequency set up for a reference pixel number, and making a video processing based on said frequency; and an information quantity conversion circuit, disposed in said processor, for supplementing insufficient pixel information, and forming a video with a predetermined aspect ratio, when an electronic endoscope having the image pickup element with other number of pixels than said reference pixel number is connected.

2. The electronic endoscopic apparatus according to claim 1, wherein said processor comprises a determination circuit for determining the number of pixels for the image pickup element mounted on the electronic endoscope by communicating with the electronic endoscope when the power is turned on.

3. The electronic endoscopic apparatus according to claim 1, wherein said signal processing circuit drives the image pickup element based on an NTSC system, and said electronic endoscopic apparatus further comprises a main memory for memorizing the video signal data acquired at a timing of the NTSC system in sequence, an auxiliary memory for memorizing the same video signal data stored in said main memory, and a conversion circuit for converting a video signal of the NTSC system into a video signal of the other television standard, in which the video signal data is read from said main memory at a timing of the other television standard, and for the data in a period for which the writing of the next data overtakes the reading of the data in said main memory, the writing of the data into said auxiliary memory is inhibited and the data is read from said auxiliary memory.

4. The electronic endoscopic apparatus according to claim 3, wherein said conversion circuit reads the video signal data memorized in said auxiliary memory to alternately provide the odd field data and the even field data output from the image pickup element.

* * * * *